April 7, 1931. L. C. HUFF 1,799,234
LINING FOR METAL PARTS OF OIL CRACKING APPARATUS
Original Filed April 21, 1926 2 Sheets-Sheet 1
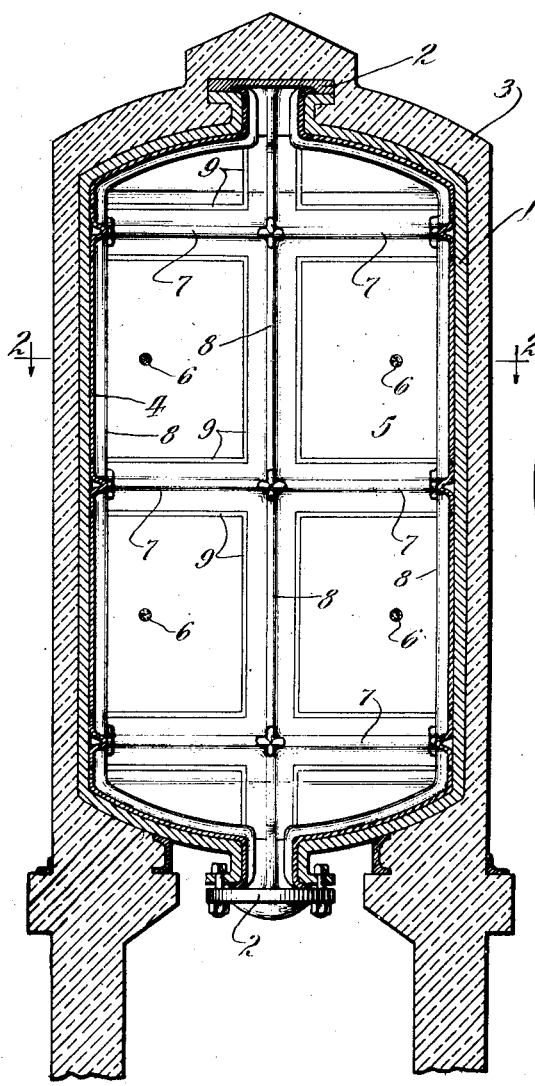
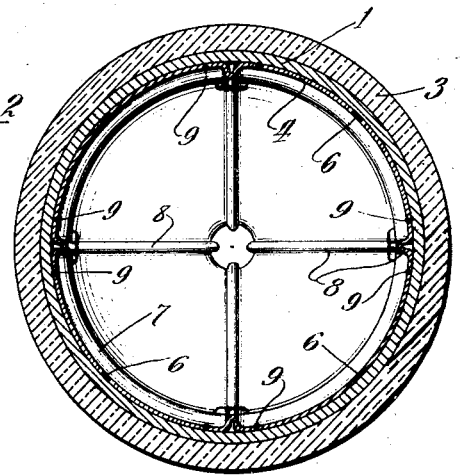

Patented Apr. 7, 1931

1,799,234

UNITED STATES PATENT OFFICE

LYMAN C. HUFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

LINING FOR METAL PARTS OF OIL-CRACKING APPARATUS

Application filed April 21, 1926, Serial No. 103,477. Renewed April 7, 1930.

This invention relates to improvements in a lining for the metal parts of an oil cracking apparatus, and refers more particularly to the idea of lining a vessel, tube, pipe, or the like such as the dephlegmator, reaction chamber, heating tube, transfer lines or the like of an oil cracking apparatus for the primary purpose of preventing corrosion and consequent deterioration of the inner walls of said metal tubes, chambers, piping and the like heretofore referred to.

In its specific embodiment, the present invention contemplates that the inner wall of the particular pipe or chamber will be provided with a lining of metal, said lining being provided longitudinally and transversely with spaced expansion folds or flexible joints, the latter functioning to take up and compensate for the difference in expansion between the lining per se and the metal wall of the pipe or vessel of which it forms a lining.

The oil industry at the present time is faced with a very serious corrosion problem, particularly in the reaction chamber, dephlegmator and adjacent communicating piping, and the solution of this problem, therefore, becomes of vital importance. The present invention has been perfected to solve this very serious problem in a highly advantageous manner.

Heretofore vessels and piping of an oil cracking apparatus have been lined. This lining has failed in its purpose because provision was not made for the increase in expansion of the lining per se as compared with the metal wall of the element of which it formed the lining. This caused the lining to buckle and bulge and tear apart in a comparatively short time.

The present invention provides for expansion folds or flexible joints connecting sections of lining material, which expansion folds function to take up and compensate for the difference in expansion between the lining and the wall of the element.

In the drawings,

Fig. 1 is a cross-sectional elevational view, illustrating the adaptation of my invention to an expansion chamber of an oil cracking apparatus;

Fig. 2 is a cross-sectional view on line 2—2 of Fig. 1;

Figure 3:
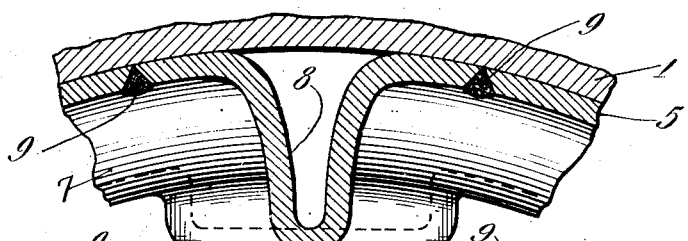
Fig. 3 is an enlarged fragmentary cross-sectional plan of an expansion fold, illustrating both the transverse and longitudinal fold.
Figure 4:
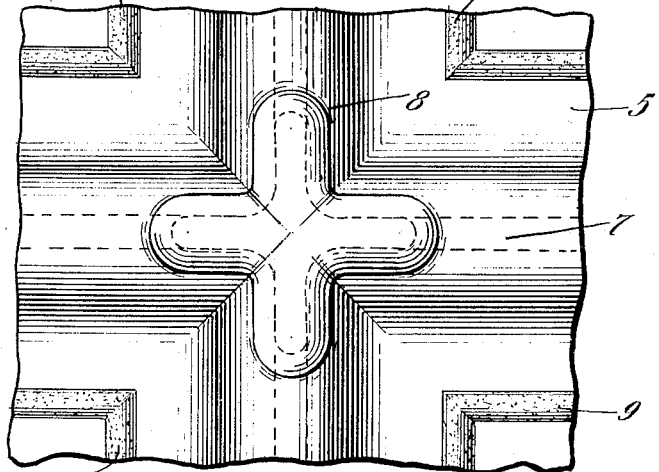
Fig. 4 is a face view of the construction shown in Fig. 3.

Referring in detail to the drawings, 1 designates the metal wall of an expansion chamber provided with the upper and lower manhole plates 2, and preferably insulated as shown at 3. This expansion chamber forms part of an oil cracking apparatus, it having been thought unnecessary to describe in detail the inlets and outlets for vapors, heated oil, unvaporized residue and the like, since it is obvious that these are provided in the commercial unit. Inside of the chamber 1 is mounted an internal lining referred to as a whole 4. This internal lining 4 preferably comprises separate sheets of flat metal curved to conform to the curvature of the wall 1. A section may be referred to at 5. Centrally of the section 5, there is provided a hole 6, the purpose of which will be hereinafter explained. Between the sections 5 are connected the transverse expansion folds 7 and longitudinal expansion folds 8. These expansion folds may comprise separate pieces, as shown in Figs. 1 to 4, welded to the sections of lining 5, as shown at 9. The expansion folds 7 and 8 function to compensate for and take up the increased expansion of the lining as compared to that of the outer shell, thus preventing buckling of the inner lining and protecting the side walls of the shell itself from the corrosion action of the vapors contained therein.

It is proposed that the sections 5 comprising the lining will be placed in the vessel before the head of the vessel is welded in place, although the invention contemplates that the lining may be cut into small sections, passed through the manholes 2, and then mounted in the interior of the vessel. Utilizing the former method as being preferred, after the head is welded on the vessel, the individual pieces comprising the lining are assembled in their proper place and the expansion folds welded in place between them. The lining may be anchored to the outer shell at central points in the plates so that the expansion will be outward from the center of the plates and into the expansion folds. One method of anchoring is to provide the circular hole 6 in the center of the plate, which may be subsequently filled by electric welding flush with the inner surface of the lining. This forms an excellent anchor and causes the expansion of the lining to be directed into the expansion folds.

It will be obvious to those skilled in the art that I have, in effect, provided a lining which forms a complete container placed inside the vessel, and, as before pointed out, the lining can be readily installed while the vessel is being manufactured, or may be made in small sections and inserted through the manhole openings. The manholes may be made of any special material that will withstand the corrosion action of vapors, such as aluminum and chromium alloy steel, or may be constructed of ordinary steel of any desired thickness. As it wears away, due to corrosion, using the latter material, it can be conveniently replaced since it does not affect the structural strength of the vessel itself.

I have illustrated the invention as being applied to the reaction chamber of a cracking apparatus. It is understood that the invention is not limited to use with an expansion chamber, but contemplates the insertion of a lining with expansion folds in any metal element of a cracking apparatus where corrosion might attack the metal wall of that element.

Figure 5:
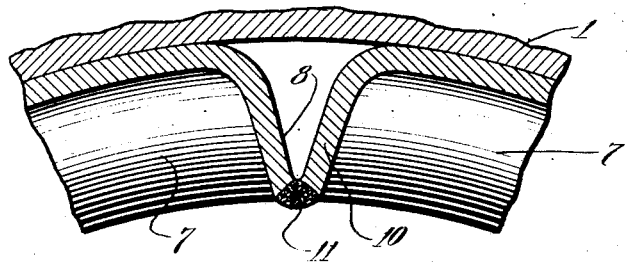
Figs. 5 and 6 illustrate different methods of constructing the expansion folds, and are modifications of Fig. 3.
Figure 6:
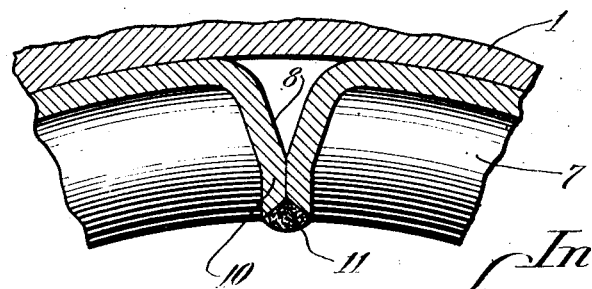

Figs. 5 and 6 show different methods of constructing the expansion folds. In the construction shown in Figs. 5 and 6, the edges of the lining are flanged outwardly, as shown at 10, and the tips are welded together, as shown at 11. It is understood, of course, that the metal lining itself may be made of corrosive-resistant material. The expansion folds as above described, may take the form of a separate metal piece of the bellows type, as shown in Fig. 3, or the ends of the lining may be flanged outwardly and the tips welded together. It is understood, of course, that the metal of the lining is thoroughly annealed after shaping.

I claim as my invention:

1. In combination with the walls of metal elements of an oil cracking apparatus, a metal lining therefor, comprising a plurality of separate sections each anchored to the wall of the metal element at a central point of the section, whereby the sections expand from their centrally anchored points and expansion folds formed from a different metal interposed between and at all sides of said sections.

2. In combination with the walls of metal elements of an oil cracking apparatus, a metal lining therefor, comprising a plurality of separate sections each anchored to the wall of the metal element at a central point of the section, whereby the sections expand from their centrally anchored points and expansion folds interposed between and at all sides of said sections.

LYMAN C. HUFF.